US006553117B1

(12) United States Patent
Armistead et al.

(10) Patent No.: US 6,553,117 B1
(45) Date of Patent: Apr. 22, 2003

(54) PROGRAMMABLE MULTIPLE-STANDARD DIGITAL COMMUNICATIONS SYSTEM

(75) Inventors: R. Ashby Armistead, Los Altos, CA (US); Trevor Alan Schulze, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/106,820

(22) Filed: Jun. 29, 1998

(51) Int. Cl.$^7$ ................................................ H04M 7/04
(52) U.S. Cl. ...................................... 379/398; 379/394
(58) Field of Search .............................. 379/93.05, 398, 379/394; 370/466; 703/16; 327/432

(56) References Cited

U.S. PATENT DOCUMENTS

| | | | | |
|---|---|---|---|---|
| 4,308,559 A | * | 12/1981 | Schiff | 380/266 |
| 4,634,903 A | * | 1/1987 | Montorfano | 327/432 |
| 4,771,449 A | * | 9/1988 | Kiko et al. | 379/93.05 |
| 5,016,086 A | * | 5/1991 | Inoue et al. | 257/690 |
| 5,222,136 A | * | 6/1993 | Resmussen et al. | 380/266 |
| H1590 H | * | 9/1996 | Douglass | 703/16 |
| 6,178,180 B1 | * | 1/2001 | Eng et al. | 370/466 |

* cited by examiner

Primary Examiner—Forester W. Isen
Assistant Examiner—Jefferey Harold
(74) Attorney, Agent, or Firm—Marger Johnson & McCollom, P.C.

(57) ABSTRACT

A circuit for communicating digital data is disclosed. The circuit can connect with up to 12 digital data lines (L0 through L11) for communication under a T1 or E1 standard. Control processor 36 selects the appropriate communication standard to be used by each framer/line interface processor F0 through F11, and communicates these over control bus 38. Control processor 36 also selects an appropriate line impedance for each line input/output circuit IO0 through IO11, and communicates this information over control bus 38 to control logic 34. Control logic 34 uses control lines 39 to electronically select the impedance for each line input/output circuit IO0 through IO11. Circuit 22 can be easily configured or reconfigured to receive data with different data formats and line impedances. In one preferred embodiment, each framer/line interface processor and line input/output circuit can be independently controlled, such that multiple communication formats can be simultaneously processed by circuit 22.

19 Claims, 6 Drawing Sheets

PROGRAMMABLE MULTIPLE-STANDARD DIGITAL COMMUNICATIONS SYSTEM

FIELD OF THE INVENTION

This invention pertains generally to digital communications over cabled networks, and more particularly to systems connectable to the lines of a communications network.

BACKGROUND OF THE INVENTION

Man's innate desire to communicate has manifest itself in a rich variety of communications networks and formats that span recorded history. Of particular importance throughout civilized history have been communication networks that allow distant communications. The telegraph, a primitive digital communication network, was the earliest form of distant electrical communication over physical cable networks. The telephone network, an analog communication system, to a large extent relegated the telegraph to obsolescence. The main drawback of the telegraph system was not its digital format, but its inferior data rate and specialized (human) transmitters and receivers. The advent of affordable digital (non-human) processors capable of reliably sending or receiving millions of digital symbols each second, coupled with the increasing demand for the interconnection of digital systems, have fueled a phenomenal resurgence in the area of digital communications over the past few decades.

Samuel Morse possessed a unique advantage over the developers of modern digital communications networks—as he developed his communication format, he had no competing standards to contend with. In contrast, several formats have battled for dominance in the digital communications industry. In the medium-speed digital telecommunications arena, two pulse code modulation formats (each having several variations) have emerged as co-winners in this battle; these formats are commonly referred to as the T1 and E1 standards.

The T1 standard predominates throughout North America and some parts of Asia, particularly Japan. This standard defines signaling at a digital data rate of 1.544 million bits per second (bps). A typical T1 signal comprises digitized versions of 24 voice channels, each channel represented by 8,000 8-bit samples per second. A T1 signal transmits 8,000 frames of information per second; each frame contains 193 bits of information made up of one 8-bit sample from each channel, 24 signaling bits, and one synchronization bit. FIG. 1 illustrates the T1 format pictorially. Other variations on this basic T1 theme exist.

In other parts of the world, including Europe and China, E1 is the dominant standard. The digital data rate for the El standard is 2.048 million bps. This standard can support 30 voice channels at 8,000 8-bit samples per second. An additional 2 channels (at time slot 0 and time slot 16) are reserved for signaling and synchronization. Like T1, E1 prescribes 8,000 frames of information per second. Each E1 frame contains 256 bits, versus 193 for T1, with synchronization and signaling handled by 16 bits per frame. FIG. 2 illustrates the E1 format.

Because of the differences in format between E1 and T1, T1 transmitters and receivers have historically required specialized processors to create or interpret T1 signals—processors that are incompatible with El signals and processors, and vice-versa. Consequently, digital communications equipment suppliers who desire to support both standards have in the past offered separate products—one tailored for E1 and another tailored for T1. This solution requires that suppliers design, build, and hold in inventory separate integrated circuits and circuit boards for each standard supported.

SUMMARY OF THE INVENTION

Integrated circuits now exist with the capability to interpret or construct either a T1 or an E1 bit stream. Despite this advantage, system suppliers have continued to differentiate E1 and T1 hardware. One of the primary reasons for continued differentiation relates to the impedance that a system must present to an incoming or outgoing E1 or T1 line. T1 line impedance is specified at 100 ohms, while E1 supports two impedance standards, 75 ohms and 120 ohms. Thus, even with a common E1/T1 processor, resistors, and sometimes other circuit elements, must be swapped at the board level in order to allow a change in signal format.

It is recognized herein that a complete system that can handle T1, and preferably both E1 transmission standards, without hardware customization either by a supplier or by an end user, is desirable. It is believed that the systems described herein are the first electronically-configurable T1- and E1-compatible digital communication systems in existence. This invention may advantageously allow a supplier to offer a single, versatile solution for a given digital communication application, which the customer may then configure or reconfigure as needed. The invention offers reliability and ease of configuration to the customer, portability of a single unit between systems utilizing different transmission standards, and even the possibility of an on-the-fly reconfigurable or switchable connection. Such a system may be capable of detecting whether an E1 or T1 signal is present by reconfiguring to each standard in turn, attempting to establish lock, and moving on if lock is not established.

In one aspect of the invention, a circuit for communicating digital data over a wire is disclosed. This circuit comprises a processor programmed for use with digital data in at least two different communication formats and an electrical connector for attaching the circuit to a wire for purposes of digital communication. The circuit further comprises an impedance matcher electrically connected between the electrical connector and the processor. This impedance matcher has at least two electronically selectable values of impedance, preferably with impedance values corresponding approximately to each of the impedance values expected by one of the communication formats. The circuit further comprises a controller connected to the processor and the impedance matcher for purposes of electronically selecting one of the communication formats and one of the selectable values of impedance. In a preferred embodiment, impedance values are paired with communication formats, such that only specified combinations of impedance and data format are selectable.

In a further aspect of the invention, electronically-configurable impedance matching circuitry is incorporated directly onto an integrated circuit that contains processor circuitry. This may provide further advantages of reduction in component count, control wiring complexity, and reduced signal reflections. Preferably, such an integrated circuit contains control circuitry for changing both the communication format and impedance in response to a single command.

In yet another aspect of the invention, a circuit which communicates multiple digital data signals simultaneously over separate wires is disclosed. This circuit comprises multiple data processors, each programmed for use with digital data in at least two different communication formats. Each data processor is electrically connected to an impedance matcher, and each impedance matcher has at least two electronically selectable values of impedance. This circuit further comprises control logic for electronic selection of impedance values for each impedance matcher, and a programmable control processor that is connected to both the control logic and the data processors. Preferably, the control processor has the capability to independently select impedance values and communication formats for each pairing of impedance matcher and data processor.

BRIEF DESCRIPTION OF THE DRAWING

The invention may be best understood by reading the disclosure with reference to the following figures:

FIG. 9, which depicts an alternative electronically-switchable impedance matching circuit.

DETAILED DESCRIPTION OF THE PREFERRED EMBODIMENTS

The present invention generally applies to circuits for processing and communicating digital signals over a wire, whether these circuits send, receive, or both send and receive digital signals over such a wire. The invention may be employed in any circuit which contains a processor capable of sending or receiving digital data in two or more formats, where line impedance requirements for the two formats differ. Examples of such circuits include access concentrators, switches, bridges, routers, modem boards, private branch exchange (PBX) equipment, and central site telephone equipment. However, the following description will focus on only one of these applications, the access concentrator, such that the details of the invention may be clearly conveyed.

The following terms have the following meanings for purposes of this disclosure. A digital data signal is any signal that conveys digital information; such a signal may be baseband or broadband, and is not limited to any specific physical signaling scheme. A processor constructs, modifies, translates, disassembles, and/or interprets digital data signals. A wire includes an electrical conductor pair; some examples of a wire are a coaxial cable, a twisted pair, a cable containing several twisted pairs, and a single conductor connecting two devices sharing a common groundplane. An electrical connection requires an electrically conductive path, although such a path may include inductive coupling such as a transformer. An impedance matcher provides at least two selectable values of impedance.

Figure 1:
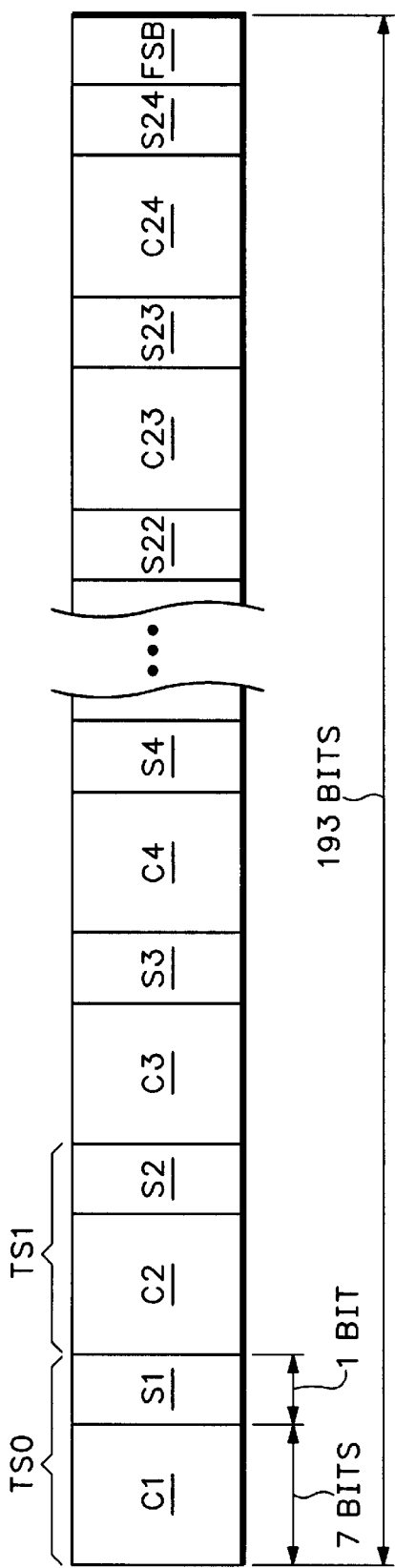
FIGS. 1 and 2, which respectively illustrate aspects of the T1 and E1 communication formats.
Figure 2:
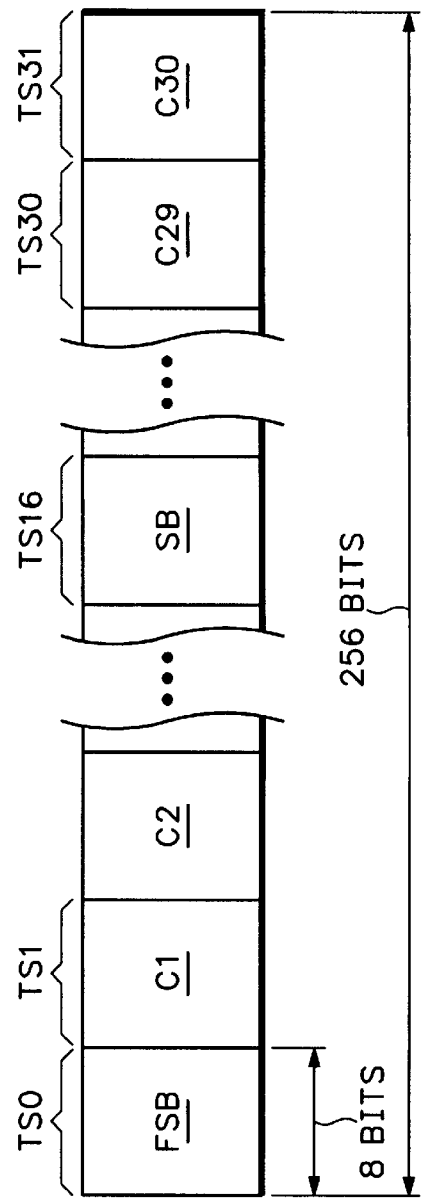
Figure 3:
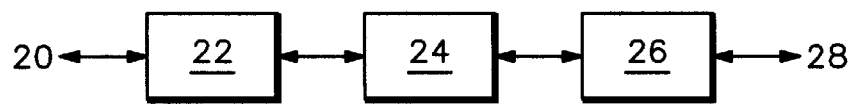
FIG. 3, which contains a block-level system overview for a system utilizing the present invention.

With reference to FIG. 3, a digital communication system that incorporates an embodiment of the present invention will now be described. This system includes E1/T1 terminator 22, which translates E1 or T1 data streams received over wire 20 into a data rate and format compatible with modem array 24, and communicates these to modem array 24. Likewise, modem array 24 communicates outgoing digital data streams back to terminator 22, which translates these data streams into a format and data rate compatible with the E1 or T1 transmission standard and transmits the translated data streams onto wire 20. Modem array 24 also communicates with router 26, which typically interprets the data streams received by modem array 24 as packets and routes these onto an Ethernet or similar connection, and vice-versa. This system is typical of those used by internet service providers (ISPs), which allow multiple residential and business customers to link to the internet via modem.

Figure 4:
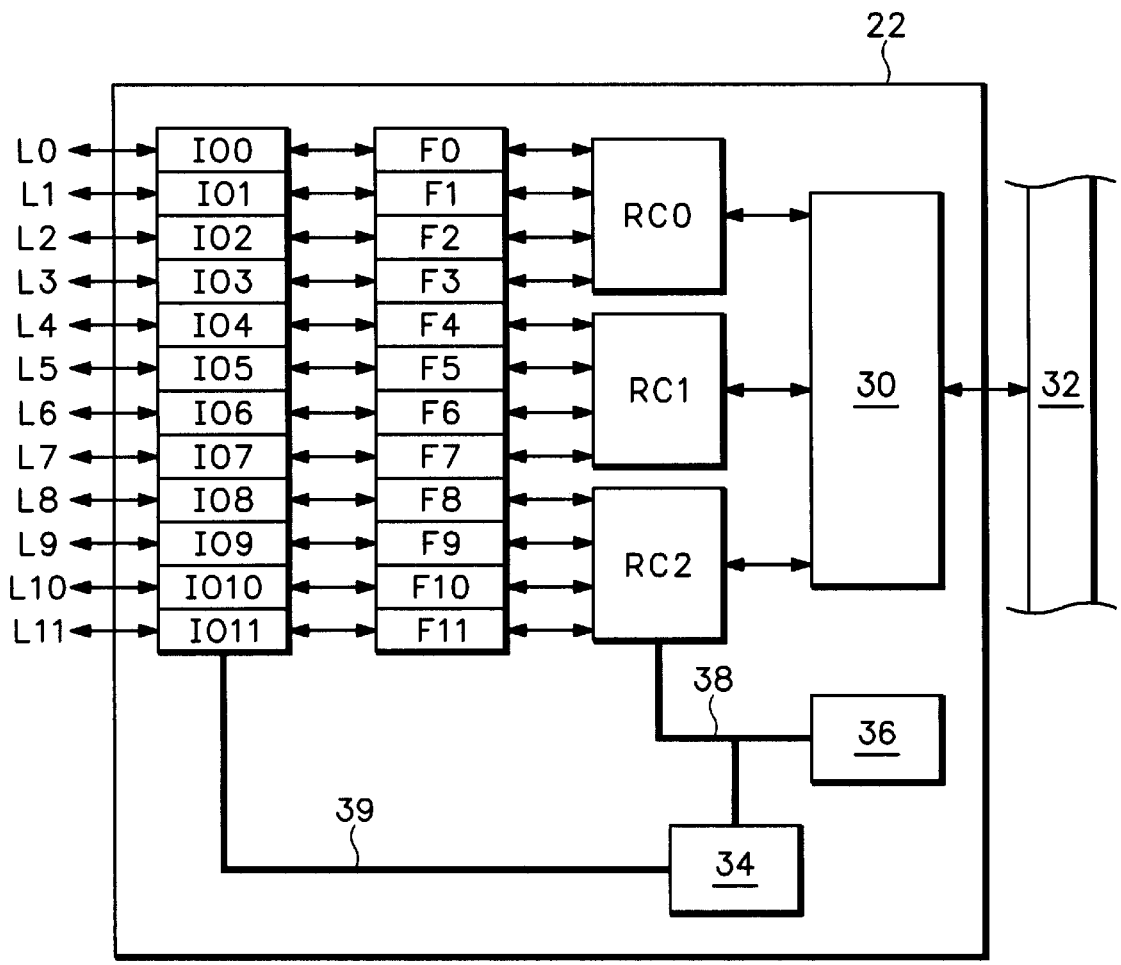
FIG. 4, which depicts a block-level diagram for an access concentrator circuit utilizing the present invention.

In large systems of the type described above, E1/T1 terminator 22 may be an access concentrator. An access concentrator not only transmits and receives E1 or T1 data streams, but also switches or multiplexes a number of received E1 or T1 bit streams, typically onto a single bus. For example, FIG. 4 illustrates an E1/T1 terminator 22 which functions as an access concentrator by terminating 12 pairs of incoming and outgoing E1 or T1 digital connections, L0 through L11, placing these 24 connections in communication with a multiple 8 MHz time-division-multiplexed data bus 32. Digital connections L0 through L11 are physically formed by connecting wires, e.g. using electrical connectors, through line input/output circuits IO0 through IO11. Each of line input/output circuits IO0 through IO11 pass data streams to and from connections L0 through L11 and framer/line interface processors F0 through F11. Rate converters RC0, RC1, and RC2 multiplex data streams from framer/line interface processors F0 through F11 into switch 30, and demultiplex data streams from switch 30 that pass in the opposite direction. Switch 30 may, for instance, comprise one or more circuits that handle communication between data bus 32 and rate converters RC0, RC1, and RC2.

In a preferred embodiment of the invention, a control processor 36 and control logic 34 comprise a means for electronically setting both the communication format for each of the framer/line interface processors F0 through F11, and the impedance values presented by each of the line input/output circuits IO0 through IO11. For example, control processor may execute software that sends commands over control bus 38 to each of processors F0 through F11, causing them to process data streams as either T1 or E1 format. This same software may send commands over control bus 38 to programmable logic 34, causing logic 34 to enable or disable signals on impedance control lines 39. Impedance control lines 39 connect to line input/output circuits IO0 through IO11, allowing signals from logic 34 to select between T1 impedance (100 Ω), E1 high impedance (120 Ω), and E1 low impedance (75 Ω) for each of line input/output circuits IO0 through IO11. In one preferred embodiment, impedance values can be independently selected for each of IO0 through IO11, while in another preferred embodiment, IO0 through IO11 may only be set to the same value. Likewise, F0 through F11 may be slaved to the same data format, or independent format selection for each of F0 through F11 may be provided for.

Figure 5:
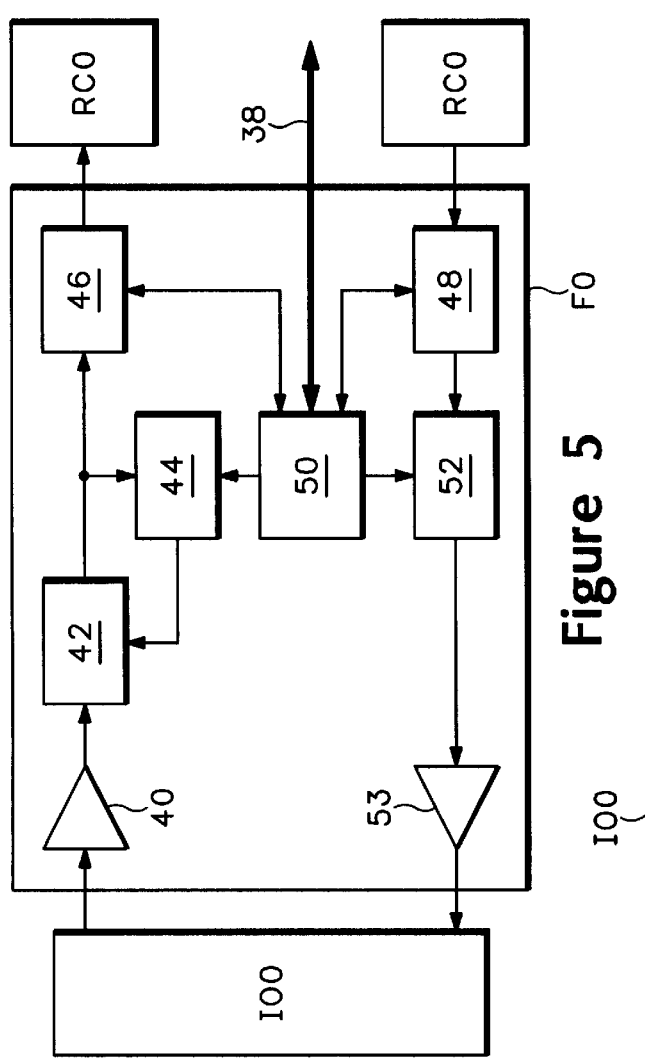
FIG. 5, which illustrates block-level aspects of a framer/line interface processor that may be used in the present invention.

Operation of a framer/line interface processor (e.g. F0) will now be described with reference to FIG. 5. A typical framer/line interface processor comprises a single integrated circuit that accomplishes several tasks. It amplifies the incoming data stream to compensate for attenuation of the signal during transmission (e.g., using amplifier 40). It may include a comparator 42, which samples the incoming data stream and makes decisions as to whether a 1 or a 0 occupies each bit location in a data stream. A phase-locked loop 44 uses the framing bits of an incoming signal to adjust the sample points of the comparator and maintain lock with the incoming signal. The sampled data stream is fed into slip buffer 46, which stores frames of data and releases them to rate converter RC0, generally at a set bit rate that is higher than that of the highest bit rate data stream that may be received by F0.

The framer/line interface processor preferably also takes data from rate converter RC0 and formats it for transmission over a wire. This operation preferably utilizes a slip buffer 48 to buffer output data. Output signal constructor 52 supplies frames of bits from slip buffer 48 to output driver 53 at an appropriate frequency.

Framer controller 50 controls overall operation of the chip. For instance, framer controller 50 may select the reference clock frequency to be used by phase locked loop 44 to match approximately the clock frequency of the incoming data format (e.g. 1.544 MHz for T1 or 2.048 MHz for E1). It may also contain information that allows phase locked loop 44 to recognize and process the framing bits. Framer controller 50 may also control operation of slip buffer 46. In a preferred embodiment, controller 50 actually interprets some of the signaling bits contained in an incoming data stream, and conveys signaling information to control processor 36 over control bus 38. Likewise, controller 50 controls the data stream sent to IO0. This may entail inserting frame synchronization bits and signals in each frame, and controlling the rate of output signal constructor 52.

Figure 6:
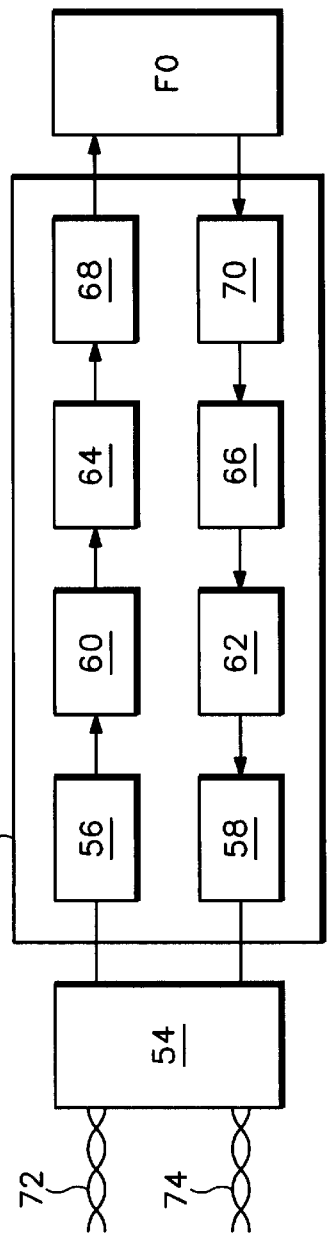
FIG. 6, which shows block-level functionality for line input and output circuitry that may be used in the present invention.

Overall operation of the line input/output circuits (e.g. IO0) will now be described with reference to FIG. 6. A line input/output circuit preferably serves the functions of line protection and impedance matching. For example, a wire may comprise twisted pairs 72 and 74, which may be interfaced through an electrical connector 54 to line input/output circuit IO0. Line input/output circuit IO0 can include several line protection elements: common mode chokes (56 and 58) for suppressing EMI, surge protectors (60 and 62) for protection from lightning strikes and other high-voltage or high current events, and isolation transformers (64 and 66) for preventing DC groundpath problems. It is preferable that impedance matchers 68 and 70 be placed as the last element before framer F0, in order to minimize line reflections.

Figure 7:
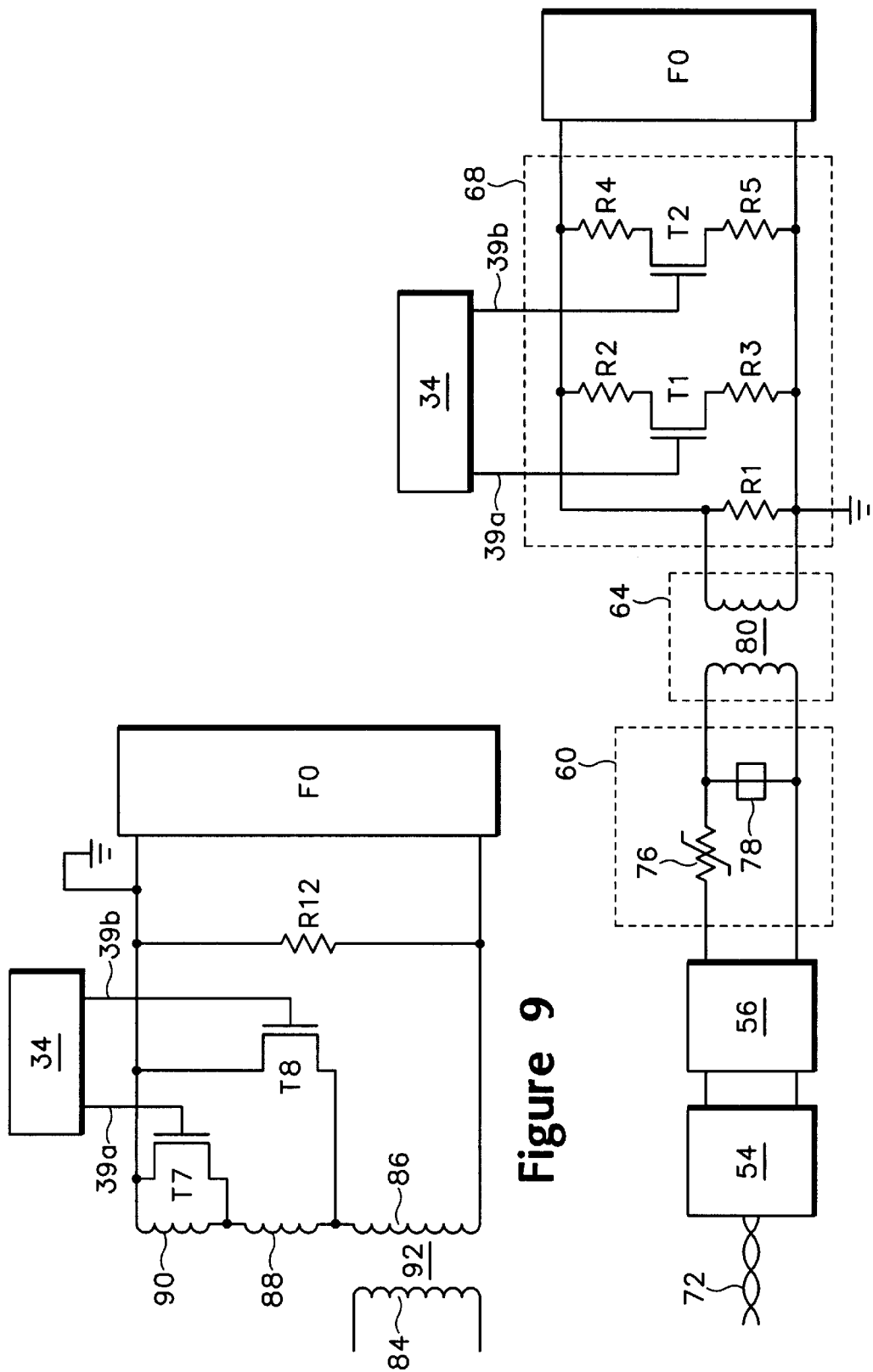
FIG. 7, which illustrates an electronically-switchable input impedance matching circuit.

FIG. 7 illustrates line input circuitry that may be used in conjunction with an embodiment of the present invention. First, this circuitry provides a surge protector 60 that includes both series positive temperature coefficient (PTC) resistor 76 and parallel sidactor 78: PTC resistor 76 heats up and becomes substantially more resistive if abnormally large current values are present in the incoming line; sidactor 78 attempts to clamp line voltages that exceed a preset threshold, e.g., 60 V. Second, this circuitry provides an isolation transformer 64 that nominally comprises a 1:1 turns ratio coil 80, capable of withstanding a 3000 V voltage spike. Finally, this line input circuitry comprises input impedance matcher 68.

Input impedance matcher 68 comprises five resistors and two switches. Resistor R1 has a nominal value of 120 Ω, resistors R2 and R3 have nominal values of 300 Ω each, and resistors R4 and R5 have nominal values of 100 Ω each. T1 and T2 are CMOS field effect transistor pass gates. Preferably, these gates respond to TTL-level inputs—the gates are off for gate voltages less than about 0.8 V, and on for gate voltages greater than about 2.0 V.

In operation, impedance matcher 68 allows the high-input impedance (e.g. > 50 KΩ) framer F0 to match with one of four possible line impedances (although only three of these can be solved for exactly, with the fourth being essentially take-what-you-get). Programmable logic 34 selects the appropriate resistance electronically by bringing control lines 39*a* and 39*b* to an appropriate voltage pair. For example, using the resistance values disclosed above, a large drain-to-source resistance for T1 or T2 off (e.g. >50 KΩ), and a small drain-to-source resistance for T1 or T2 on (e.g. <5 Ω), the input impedance values shown in Table 1 below apply.

TABLE 1

| Line 39a | Line 39b | Input Impedance | Specification matched |
|---|---|---|---|
| ≦0.8 V | ≦0.8 V | 120 Ω | E1 120 Ω |
| ≧2.0 V | ≦0.8 V | 100 Ω | T1 |
| ≦0.8 V | ≧2.0 V | 75 Ω | E1 75 Ω |
| ≧2.0 V | ≧2.0 V | 67 Ω | Unused |

Figure 8:
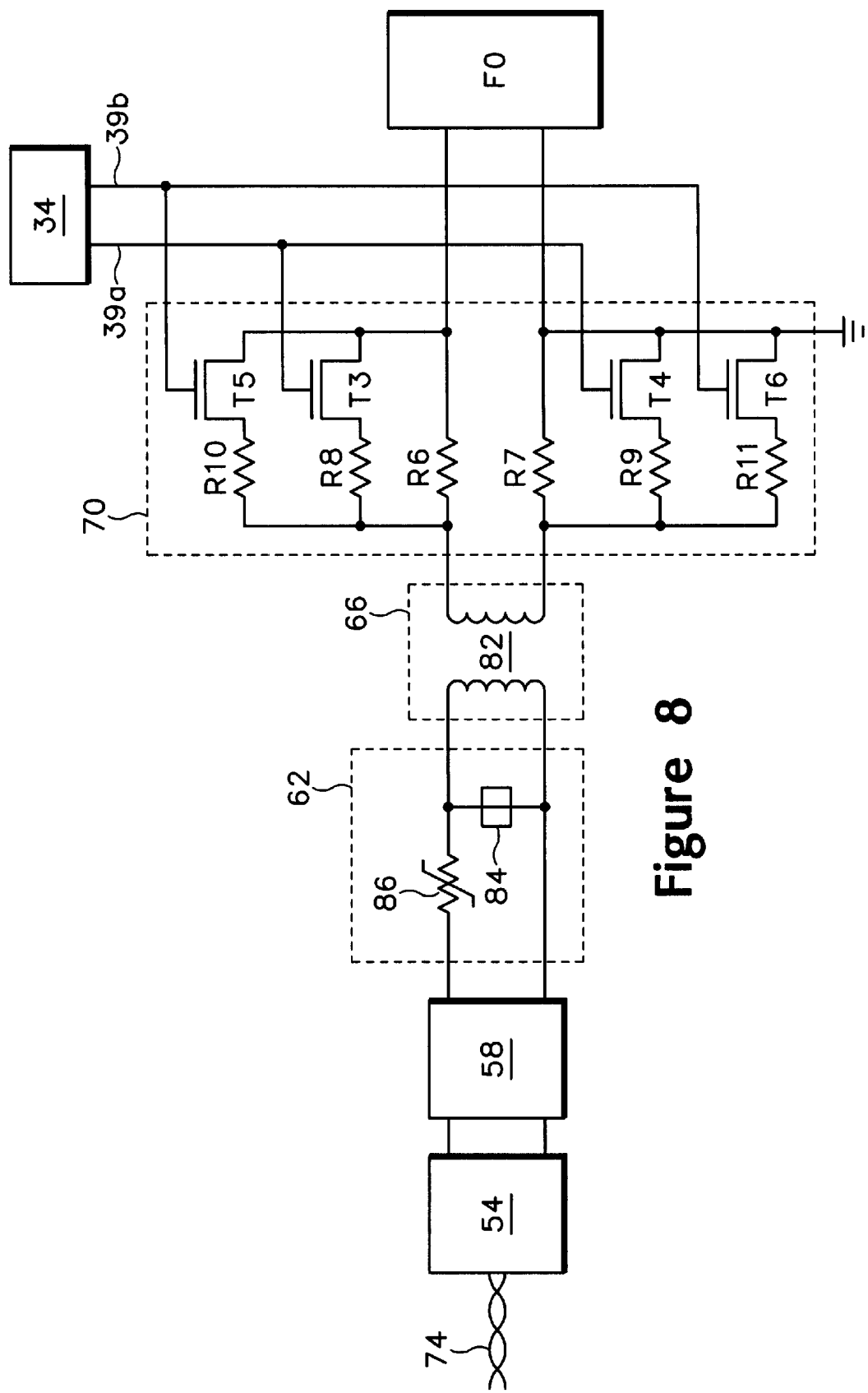
FIG. 8, which illustrates an electronically-switchable output impedance matching circuit.

An analogous line output circuit configuration is depicted in FIG. 8. Because the output impedance of F0 is typically lower than that required by the transmission standard, series resistors R6 and R7 are placed in the tip and ring lines to present the proper impedance to twisted pair 74. Depending on system constraints, R6 and R7 may be selected at an intermediate value (e.g. 50 Ω each) that provides acceptable line performance at 75 Ω and 120 Ω also. Thus one preferred embodiment uses only resistors R6 and R7 in output impedance matcher 70.

A second preferred embodiment uses the complete output impedance matcher circuitry illustrated in FIG. 8. R6 and R7 have nominal impedance values of 60 Ω each, R8 and R9 have nominal impedance values of 300 Ω each, and R10 and R11 have nominal impedance values of 100 Ω each. Assuming negligible resistance at the output of framer F0, this circuit presents an output impedance to twisted pair 74 that matches the values shown in Table 1.

Yet another preferred embodiment utilizes a multiple-tap secondary winding on an isolation transformer to provide the necessary impedance selection. For example, FIG. 9 illustrates a 120 Ω resistor in parallel with the input to framer F0. Transformer 92 comprises a primary winding 84, a first secondary winding 86, a second secondary winding 88, and a third secondary winding 90. Transistor T7 is configured to short third secondary winding 90 to ground when it is turned on by programmable logic 34. Transistor T8 likewise shorts secondary windings 88 and 90 to ground when turned on by programmable logic 34.

With proper selection of the turns ratio between primary winding 84 and secondary windings 86, 88, and 90, the apparent resistance of R12 to an input line can be changed using transistors T7 and T8. For example, turns ratios can be selected as follows for each secondary winding with respect to the primary winding: first secondary winding 86—1:1; second secondary winding 88—1:10; third secondary winding 90—1:6.25. An analogous output line circuit may be constructed by removing R12 and instead inserting two 60 Ω series resistors between framer F0 and transformer 92.

Figure 10:
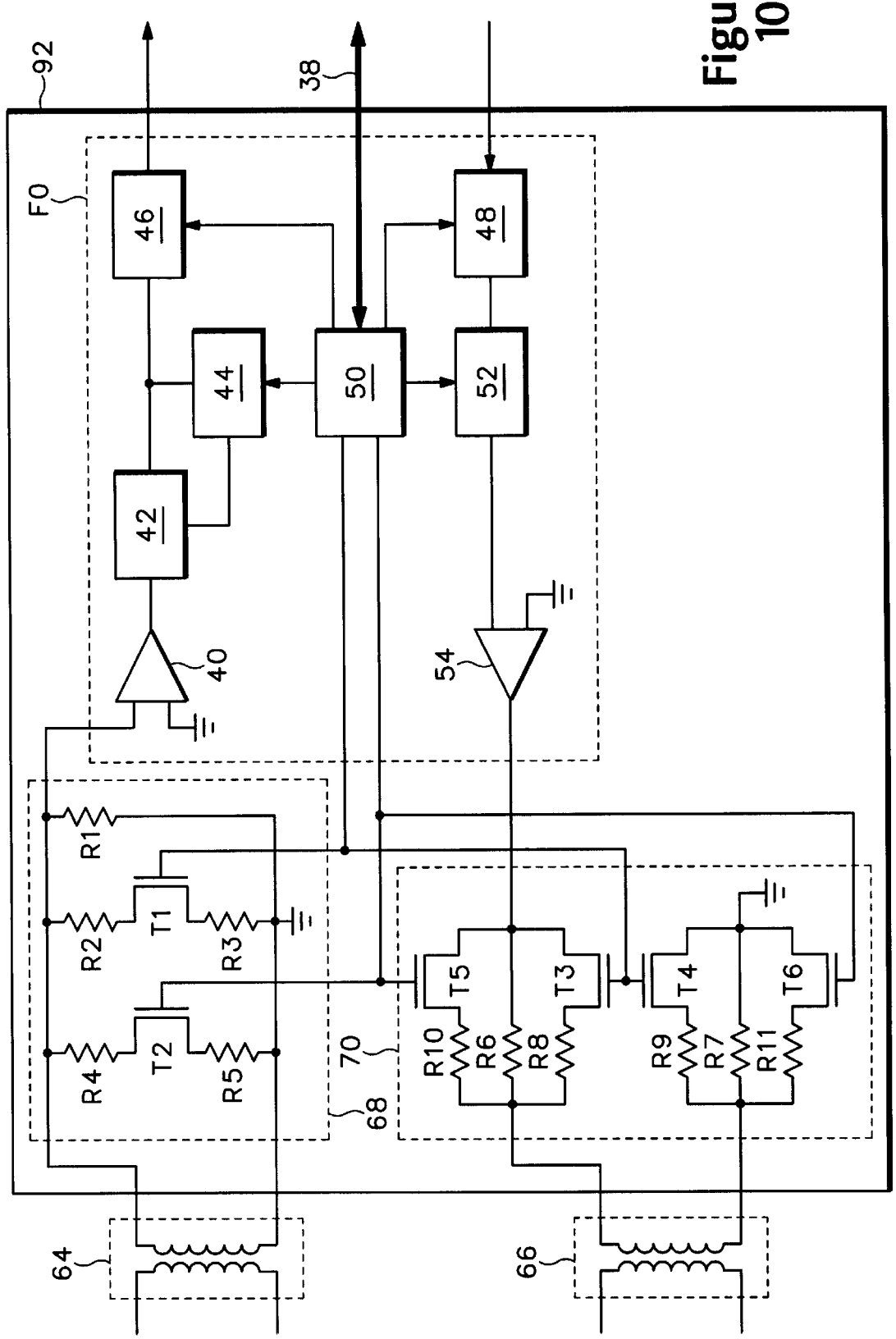
FIG. 10, which shows a single-integrated circuit electronically-configurable impedance matcher/framer/line interface processor.

In a further embodiment of the invention, it is recognized that combination of impedance matcher circuits 68 and 70 (or just 68 if output selectability is not desired) and framer/line interface processor F0 on a single integrated circuit may be desirable. This combined circuit is represented in FIG. 10 by circuit block 92.

It is further noted that in this embodiment, programmable logic 34 (illustrated in FIGS. 4 and 7–9) may be obviated, along with board-level impedance control lines 39. Frame controller 50 receives instructions as to the communication format of the received frames. Thus frame controller 50 can directly enable the appropriate gates to select impedance, at the same time it responds to a command with respect to framer operation.

After reading this disclosure, one of ordinary skill in the electronics art will recognize that many functionally equivalent electronically switchable impedance matchers may be designed for use in the present invention. For example, ideas present in the impedance matchers of FIGS. 7 and 9 may be combined to form a three-series resistor network, wherein two of the resistors may be selectively shorted to ground through parallel analog switches.

One of ordinary skill will also recognize that a large arsenal of means for electronically selecting a communication format and an impedance value are at their disposal for use as a controller. These include a programmable microprocessor, a special-purpose state machine, a programmable logic array, a field-programmable gate array, static or dynamic volatile or non-volatile random access memory, read-only memory, erasable read-only memory, electronically-erasable read-only memory, magnetic or optical storage media, latches, and combinations of these devices. Such a controller may reside entirely on a common board with the impedance matcher and processor, be distributed among several boards sharing a common bus, or even use a digital network to control communication format and impedance values.

Although the specific embodiments described herein utilize field effect transistors as analog switches, other electronic devices may serve equally well as analog switches. It is desirable that the switch be capable of functioning over the full range of expected input signals without introducing distortion, that it present a low serial resistance and capacitance when on, and high serial resistance when off.

Other modifications to the disclosed embodiments will be obvious to those of ordinary skill in the art upon reading this disclosure, and are intended to fall within the scope of the invention as claimed.

What is claimed is:

1. A circuit for communicating digital data over a wire, said circuit comprising:
    a processor programmed for use with digital data in at least two different communication formats;
    an electrical connector for attaching said circuit to a wire for purposes of digital communication;
    first and second impedance matchers electrically connected between said electrical connector and said processor, said impedance matchers having at least two electronically independently selectable values of impedance; and
    a controller connected to said processor and said impedance matchers, capable of electronically selecting one of said communication formats for said processor and one of said selectable values of impedance for said impedance matchers.

2. The circuit of claim 1, wherein said impedance matchers comprise at least one analog switch, the switch electronically controllable by the controller.

3. The circuit of claim 2, wherein said analog switch is a field-effect transistor.

4. The circuit of claim 3, wherein said controller controls the gate voltage of said field-effect transistor.

5. The circuit of claim 2, wherein said analog switch is in series with a resistor within the impedance matchers, such that when the switch is activated, the effective impedance of the impedance matchers decreases.

6. The circuit of claim 2, wherein said analog switch is in parallel with a resistor within the impedance matchers, such that when the switch is activated, the effective impedance of the impedance matchers increases.

7. The circuit of claim 2, wherein said circuit further comprises an isolation transformer electrically connected between said electrical connector and said impedance matchers, said isolation transformer having a primary winding and at least two secondary windings connected in series, and wherein said analog switch is in parallel with one of said secondary windings.

8. The circuit of claim 2, wherein said analog switch and said processor reside on a common integrated circuit.

9. The circuit of claim 1, wherein during operation said controller selects one of said communication formats for said processor, and said processor selects one of said selectable values of impedance for said impedance matchers.

10. The circuit of claim 1, wherein said impedance matchers and said processor reside on a common integrated circuit.

11. The circuit of claim 1, wherein said processor and said impedance matchers are configured to receive digital data from a wire.

12. The circuit of claim 1, wherein said processor and said impedance matchers are configured to transmit digital data over a wire.

13. A circuit for communicating digital data over a wire, said circuit comprising:
    a data processor programmed for use with digital data in at least two different communication formats;
    an electrical connector for attaching said circuit to a wire for purposes of digital communication;
    two impedance matchers electrically connected between said electrical connector and said processor, said two impedance matchers have at least two electronically [and independently] selectable values of impedance wherein the at least two electronically selectable values of impedance comprise nominal values of 75 Ω, 100 Ω, and 120 Ω;
    control logic for electronically selecting one of said selectable values of impedance; and
    a programmable control processor, said control processor connected to said control logic for purposes of selecting impedance and also connected to said data processor for purposes of selecting a communication format.

14. The circuit of claim 13, wherein said programmable control processor, said data processor, and said control logic share a common control bus.

15. The circuit of claim 13, wherein said at least two different communication formats comprise at least one format having a nominal data rate of 1.544 million bits per second and at least one format having a nominal data rate of 2.048 million bits per second.

16. The circuit of claim 13, wherein said control logic resides on said data processor.

17. A circuit for communicating digital data over a wire, said circuit comprising:
    first and second data processors, each of said processors programmed for use with digital data in at least two different communication formats;

electrical connecting means for electrically attaching said first processor to a first wire and said second processor to a second wire for purposes of digital communication;

a first impedance matcher electrically connected between said connecting means and said first processor and a second impedance matcher electrically connected between said connecting means and said second processor, said first and second impedance matchers each having at least two electronically and independently selectable values of impedance;

control logic for electronically selecting one of said selectable values of impedance for each of said first and second impedance matchers;

a programmable control processor, said control processor connected to said control logic for purposes of selecting impedance and also connected to each of said data processors for purposes of selecting a communication format.

18. The circuit of claim 17, wherein the communication format for each of said first and second data processors are independently selectable.

19. The circuit of claim 17, wherein the communication format for each of said first and second data processors are independently selectable.

* * * * *